United States Patent Office 3,154,504
Patented Oct. 27, 1964

3,154,504
PROCESS OF FOAMING AN EPOXY
RESIN COMPOSITION
James E. Carey, Millburn, and Paul D. Jones, Union,
N.J., assignors to Shell Oil Company, a corporation of
Delaware
No Drawing. Filed July 14, 1959, Ser. No. 826,896
14 Claims. (Cl. 260—2.5)

This invention relates to an expanded cellular resinous material and to a method of producing such an expanded cellular resinous material. More particularly, this invention relates to a method of producing expanded cellular epoxy resin compositions and to compositions produced according to such method.

It has been known heretofore to produce expanded cellular resinous materials by a variety of methods. It has also been known to produce expanded cellular epoxy resin materials. Cellular epoxy resin materials heretofore have been prepared by using as internal "blowing agents" compounds which decompose to produce a gas when the resin mass is heated or develops heat. The heating of the resin mass in these cases has usually been due in major part to the curing process, i.e., the exothermic reaction between the compound containing epoxy groups and a curing agent; preheating to initiate the reaction has sometimes also been required.

In the method of producing epoxy resin foams by means of internal blowing agents in which heat causes the decomposition of the compound and relase of gas, the foaming reaction and the curing reaction are simultaneous and consequently the viscosity of the foam mass increases and the structure of the liquid changes to a partially cured gel as gas is gradually released and the foam rises in the form in which the foaming and curing take place. The rate of gas formation by decomposition of internal blowing agents increases with temperature and hence is usually highest after a large part of the curing reaction has been completed. This results in the serious drawback that a large part of the foam expansion takes place when the foam is no longer sufficiently liquid to wet the surfaces of the form wherein the foam is produced or to enter and fill narrow passages of such forms. A further drawback of the use of chemical internal blowing agents is that these materials are present in the resin mixture as discrete solid particles. It is difficult to assure their even distribution in the resin mixture. The production of epoxy resin foams of uniform fine cell structure is, therefore, virtually impossible when using them.

It is an object of this invention to provide a method for producing foamed epoxy resins which are substantially uncured, wet, stable foams when in fully-foamed condition.

Another object is to provide a method for producing fully-foamed epoxy resins in which use of elevated temperatures is avoided.

It is a further object to provide stable, wet, uncured epoxy resin foams which may be prepared and cured without recourse to elevated temperatures.

Another object is to provide a method for producing fully-foamed epoxy resins without recourse to chemical blowing agents.

It is still another object to provide a convenient method for the production of epoxy resin foams of uniform fine cell structure.

Other objects of this invention will appear from the following description thereof.

Cellular resin materials produced according to the process of this invention may have a variety of desirable characteristics depending upon the specific formulation employed. Thus, the resins may be of very low density for the type of use where space-filling, thermal, and/or acoustical insulation is required, as in walls, ceilings, panels, etc., or the cured foams may be applied in uses wherein they serve as structural load-assuming sections or components as in laminated sandwich-type panels, internally-filled and reinforced elements, or both as insulating and load-assuming materials as in refrigerator insulation, building panels, etc. It is a particular advantage of the resin compositions of this invention that they are available as a fully-expanded, wet, uncured foam, which may be shaped into any desired structure and which will strongly adhere to the walls of said structure upon curing.

The cured resins produced according to this invention have good electrical and mechanical properties, thus making them particularly adaptable for such uses as electrical potting materials and in applications such as the fabrication of radar housing, aircraft components and guided missile parts.

The difficulties of the prior art methods of producing foamed epoxy resins are overcome according to this invention by mixing in a mixing zone under superatmospheric pressure a liquid mass containing at least (a) as its essential resin component a polyepoxide having an epoxy equivalent greater than 1.0, (b) an epoxy curing agent and (c) a thixotropic agent, with a fluid which is gaseous at atmospheric pressure at the temperature of the mixing zone but which dissolves at least in part in said liquid mass at said superatmospheric pressure, releasing the mixture from the mixing zone into a space maintained at substantially atmospheric pressure whereby a stable, wet foam is produced, and curing said wet foam.

The polyepoxides to be used in preparing the compositions of the present invention comprise those materials possessing more than one vicinal epoxy group, i.e., more than one

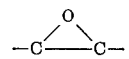

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is well known. It is described, for example, in U.S. 2,633,458. The polyepoxides used in the present process are those having an epoxy equivalency greater than 1.0.

In the foam compositions of this invention, the polyepoxides used may be of a single type or may be mixtures of several different types or molecular weights. Although some normally solid components may be included, the total mixture is in each case a liquid.

Various examples of polyepoxides that may be used in this invention are given in U.S. 2,633,458 and so much of the disclosure of that patent as is relative to examples of polyepoxides is incorporated by reference into this specification.

A class of polyepoxides which have special characteristics and special utility in this invention consists of epoxy esters and particularly epoxy esters of long chain acids. The latter are described in some detail in co-pending patent application Serial No. 666,238, filed June 17, 1957, by H. A. Newey, now U.S. Patent Number 2,940,986.

Epoxy esters are used in compositions according to this invention to provide improved flexibility or resilience of the foamed products. Foamed epoxy resins of the prior art have been generally characterized by extreme friability or brittleness. It has now been found that inclusion of at least about 2% of epoxy esters in the foam composition overcomes this very undesirable characteristic.

The addition of at least about 2% of epoxy ester has the further pronounced advantage of greatly improving the uniformity and fineness of cell structure in the resulting foams. Previously it had been necessary to add wetting agents to secure these properties. Wetting agents, however, are not converted to polymers and their presence in the finished product is sometimes objectionable. By inclusion of epoxy esters, which do react to form part of the final foam structure, it is possible to produce foams of extremely fine, uniform cell structure without addition of wetting agents.

Examples of epoxy esters include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl-9,12-octadecadienoate, butyl-9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of epoxy esters includes the epoxidized esters of unsaturated monohydric alcohols and polycarboxylic acids, such as, for example,
di(2,3-epoxybutyl)adipate,
di(2,3-epoxybutyl)oxalate,
di(2,3-epoxyhexyl)succinate,
di(3,4-epoxybutyl)maleate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybutyl)1,2,4-butanetricarboxylate,
di(5,6-epoxypentadecyl)tartarate,
di(4,5-epoxytetradecyl)maleate,
di(2,3-epoxybutyl)azelate,
di(3,4-epoxybutyl)citrate,
di(5,6-epoxyoctyl)cyclohexane-1,3-dicarboxylate,
di(4,5-epoxyoctadecyl)malonate.

Another group of suitable epoxy esters include epoxidized esters of unsaturated alcohols and unsaturated carboxylic acids, such as
2,3-epoxybutyl-3,4-epoxypentanoate,
3,4-epoxyhexyl-3,4-epoxypentanoate,
3,4-epoxycylohexyl-3,4-epoxycylohexanoate,
3,4-epoxycyclohexyl-4,5-epoxyoctanoate,
2,3-epoxycyclohexylmethyl-epoxymethylcyclohexane - carboxylate.

Still another group of suitable epoxy-containing materials includes epoxidized derivatives of polyethylenically unsaturated polycarboxylic acids such as, for example,
dimethyl-8,9,12,13-diepoxyeicosanedioate,
dibutyl-7,8,11,12-diepoxyoctadecanedioate,
dioctyl-10,11-diethyl-8,9,12,13-diepoxy-eicosanediate,
dihexyl-6,7,10,11-diepoxyhexadecanedioate,
didecyl-9-epoxy-ethyl-10,11-epoxyoctadecanedioate,
dibutyl-3-butyl-3,4,5,6-diepoxycyclohexane-1,2 - dicarboxylate,
dicyclohexyl - 3,4,5,6 - diepoxycyclohexane-1,2-dicarboxylate,
dibenzyl-1,2,4,5-diepoxycyclohexane - 1,2 - dicarboxylate and diethyl-5,6,10,11-diepoxyoctadecyl succinate.

Still another group comprises the epoxidized polyesters obtained by reacting a polyhydric alcohol and polycarboxylic acid or anhydride in which either one or both components are unsaturated such as, for example, the polyester obtained by reacting 8,9,12,13-eicosadiendioic acid with ethylene glycol, the polyester obtained by reacting diethylene glycol with 2-cyclohexene-1,4-dicarboxylic acid and the like, and mixtures thereof.

Among other groups of useful epoxy compounds are the epoxidized polyethylenically unsaturated hydrocarbons, such as epoxidized 2,2-bis(2-cyclohexenyl)-propane, epoxidized vinylcyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl-containing nitrogen compounds, such as diglycidylaniline and di- and triglycidylamine.

The polyepoxides that are particularly preferred for use in the compositions of the invention are the glycidyl ethers and particularly the normally liquid glycidyl ethers of polyhydric phenols and polyhydric alcohols. The glycidyl ethers of polyhydric phenols are obtained by reacting epichlorohydrin with the desired polyhydric phenols in the presence of alkali. Polyether A and polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value 0.514 eq./100 g.) and the like and mixtures thereof.

A curing agent is required to convert the wet epoxy resin composition into a hard, dry, stable cross-linked resin. A great variety of different curing agents for curing epoxy resins are known. Many curing agents are disclosed, for example, in "Epoxy Resins—Their Applications and Technology," by Lee et al., McGraw-Hill Book Co., Inc., 1957, in chapters 3–5. Such agents include, among others, carboxylic acids or anhydrides, such as oxalic acid or phthalic anhydride; Friedel-Crafts metal halides, such as aluminum chloride, zinc chloride, ferric chloride or boron trifluoride as well as complexes thereof with glycols, ethers, amines, phenols, acid anhydrides, ketones, aldehydes, diazonium salts and the like; phosphoric acid and partial esters thereof including n-butyl orthophosphate, diethyl orthophosphate, and hexaethyltetraphosphate; primary, secondary and tertiary amines and amino compounds, such as triethylamine, ethylene diamine, diethylamine, diethylene triamine, triethylene tetraamine, m-phenylenediamine, dicyandiamide and melamine; salts of inorganic acids, such as zinc fluoborate, potassium persulfate, nickel fluoborate and magnesium perchlorate; combinations of metal salts with tertiary amines, and the like.

Very rapid-acting curing agents, such as $BF_3$ and some of its compounds, are generally not desired in the process of this invention. These compounds, for example, initiate curing within 30–60 seconds and result in complete cures within 2 to 4 minutes. They would necessitate extreme speed in preparing the foamable mixture and would cause very rapid heat release during the curing step; thus causing a substantial rise in temperature and consequent further substantial expansion of the foam. However, a modified $BF_3$ curing agent in which a retardant such as small amount of water, e.g., 0.15%, has been added, my sometimes be used to advantage. Of the numerous curing agents which are useful in the curing of epoxy resins, those are preferably employed in the present invention which are sufficiently slow-acting so that the mixture of resin, curing agent and inert vaporizable fluid can be prepared and expanded before the gelling reaction proceeds to any substantial extent. Preferably the curing agents are sufficiently slow-acting so that the heat released during the curing action can be dissipated at least in substantial part. Preferred curing agents are those which do not cause noticeable evidence of cure until 2 to 5 minutes after the mixture is completed. Temperatures of foams generally do not exceed 100° C. during the curing step, and temperatures in excess of 200° C. do not occur in the curing process.

Particularly suitable curing agents in the process of this invention include those which are usually considered room temperature curing agents, and particularly aliphatic amines, including polyalkylene polyamines and their adducts, e.g., addition compounds with unsaturated nitriles or with epoxides. Although they are herein referred to as "relatively slow-acting," they are still relatively rapid in their action compared to curing agents which require elevated temperatures; they are in a group which is often referred to as rapid curing agents. They may cause setting of the epoxy resins in a matter of minutes. Preferred curing agents are diethylene triamine, triethylene tetramine, tetraethylene pentamine, N-hydroxyethyl-diethylene triamine, and adducts of such curing agents with mono- or polyepoxides.

It may sometimes be desirable to place foams produced according to this invention in contact with heated surfaces or into heated vessels, in which case slower curing agents which require heat may be employed, e.g., polyamine salts such as the 2-ethylhexoate of 2,4,6-tri(dimethylaminoethyl)-phenol or the adduct of a monoepoxide and a polyamine, such as a phenyl-glycidyl ether-metaphenylene diamine adduct, or acid anhydrides such as, for example, tetrahydrophthalic anhydride, pyromellitic anhydride of chlorendic anhydride.

The amount of the curing agents employed may vary over a considerable range, such as from 1% to 200% by weight of the polyepoxide, with the exact range depending on the particular type of agent selected. With curing agents having replaceable hydrogen, such as the amine agents, amounts of agent generally employed vary up to and include equivalent proportions, i.e., sufficient curing agent to furnish a replaceable hydrogen atom for every epoxy group to be reacted. In most cases, satisfactory cures are obtained with amounts varying from about 1% to about 25% by weight of the materials being polymerized. With phosphoric acid and esters thereof and with boron trifluoride complexes preferred amounts vary from about 1% to about 10% by weight. The amino compounds are preferably employed in amounts varying from about 3% to about 25%. With salts of the inorganic acids, such as the salts of fluoboric acid, amounts varying from about 3% to 20% by weight preferably are employed. Other curing agents are preferably employed in amounts varying from 1% to 80% by weight.

It may at times be desired to accelerate the rate of cure by the addition of known accelerators such as phenol or phenolic compounds. From 0.1% to 20% by weight or more of a phenol, based on the resin, may be employed. The larger proportions are particularly suitable in compositions in which the major resin compound is an apoxy ester.

An essential component of the wet foam-producing mixtures of this invention is a thixotropic agent. Thixotropy is the propety of some gels of becoming fluids of relatively low viscosity when agitated, but setting into relatively stable non-fluid masses when not agitated. The fluidity can be re-established by renewed agitation. Thixotropic agents impart thixotropy to materials to which they are added.

Numerous thixotropic agents can be employed in this invention. They include many highly absorptive materials such as pigments, asbestos floc, silicate clays, micas, colloidal silica, organic complexes of bentonite, attapulgite, metallic soap powders, metallic leafing powders, finely-divided solidified vegetable oil derivatives, and the like.

A particularly useful thixotropic agent for use in this invention is a material of the class of quaternary ammonium bentonite complexes. The bentonite complexes or salts are produced by the reaction of bentonite with organic bases or salts of organic bases through base exchange wherein the calcium, sodium, potassium, magnesium or other replaceable bases of the silicate of the bentonite enter into double decomposition with cations of organic bases. Such bentonite complexes are manufactured by the National Lead Company of New York, N.Y. In order to simplify their identification the bentonite complexes will be given the trade names Bentone with the numerals following the name Bentone designating the number of carbon atoms in the quaternary compounds from which the bentonite complex is derived. Thus Bentone 34 is a quaternary ammonium bentonite compound obtained through base exchange between bentonite and dimethyl dihexadecyl ammonium chloride. The bentonite salts of quaternary ammonium compounds which are effective as foam stabilizers include:

(1) Bentone 26—dimethyl didodecyl ammonium bentonite.
(2) Bentone 27—dimethyl dodecyl tridecyl ammonium bentonite.
(3) Bentone 30—dimethyl dodecyl hexadecyl ammonium bentonite.
(4) Bentone 34—dimethyl diehexadecyl ammonium bentonite.
(5) Bentone 36—dimethyl hexadecyl octadecyl ammonium bentonite.
(6) Bentone 38—dimethyl dioctadecyl ammonium bentonite.

The quaternary ammonium radical of these dimethyl-alkyl quaternary ammonium complexes may be represented as follows:

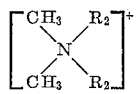

the sum of the carbon atoms being between 26 and 38, and preferably between 30 and 36. This reaction may be descriptively portrayed as one of base exchange in the following:

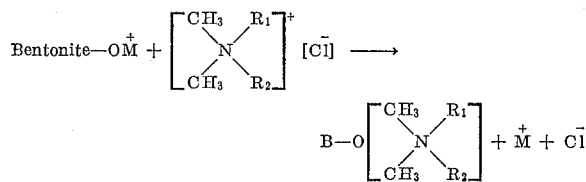

where M represents a univalent cation such as sodium but may represent multivalent cations such as calcium, magnesium, or other replaceable bases of the silicate constituent of the bentonite.

The Bentones or quaternary ammonium compounds or complexes may be used individually or in suitable mixtures or blends in the liquid resin mixtures in the proportion of from 1 to 10 parts by weight for each 100 parts by weight of the total resin content of the mixture, a preferred range of proportions of the Bentones being between 1.5 and 7 parts by weight for each 100 parts by weight of the total polyepoxide resin content of the mixture. While each of the above-named quaternary ammonium bentonite complexes is practical and effective as thixotropic agent, the best results have been obtained with Bentone 38—dimethyl dioctadecyl ammonium bentonite.

Metallic soap powders suitable as thixothopic agents are metallic soap powders of fatty acids having from 12 to 20 carbon atoms such as: zinc stearate, aluminum stearate, calcium stearate, magnesium stearate, magnesium hydroxy stearate, barium stearate, zinc laureate, calcium oleate, and strontium stearate.

The proportion of metallic soap powder or blends of metallic soap powder employed may range from 0.2 to 12, and preferably 0.5 to 5 parts by weight for each 100 parts by weight of the total resin content of the reactant mixture.

Metallic leafing powders which are effective as thixotropic agents include: aluminum leafing powder, lead leafing powder, nickel leafing powder, silver leafing powder, gold leafing powder, and stainless steel leafing powder. The effect may be due either to the leafing powder itself, or to metallic soap powder typically associated with these powders.

Metallic leafing powders are employed individually or in suitable mixtures or combinations in the proportion of from 1 to 40 and preferably 2 to 20 parts by weight for each 100 parts by weight of the total resin content of the reactant mixture. Good results are obtained when both a metallic leafing powder and a metallic soap powder are incorporated in the resin mixture. When both the metallic leafing powder and metallic soap powder are used, the metallic leafing powder may be employed in the proportion of from 0.5 to 12 parts by weight for each 100 parts by weight of the total resin content and the metallic soap powder may be used in the proportion of from ½ to 8 parts by weight for each 100 parts by weight of the total resin content.

Another useful thixotropic agent is derived from the mineral attapulgite, a hydrated magnesium-aluminum silicate. Materials of this type are available under the trade names "Attasorb" and "Permagel" from the Minerals and Chemicals Corporation of America. The available materials are ground to a fineness of 90%–95% less than 10 microns and are composed of agglomerates of needle-like particles. The powders are light-weight, free-flowing and highly adsorptive.

A colloidal silica which is useful as a thixotropic agent in the compositions of this invention is commercially available under the trade name "Cab-O-Sil" from Godfrey L. Cabot, Incorporated. It is prepared in a hot gaseous environment by vapor-phase hydrolysis of a silicon compound and is characterized by high chemical purity, low water content, extremely great external surface area and a high degree of particle separation.

The thixotropic agents employed in the process of this invention may be completely organic materials. A suitable organic thixotropic agent, for example, is a finely-divided solidified vegetable oil derivative, available under the trade name "Thixcin" from the Baker Castor Oil Company of New York. The solid has a specific gravity of 0.990 and is readily dispersed in non-aqueous liquids.

Expansion of the liquid resin composition is provided in the process of this invention by a material which is in gaseous or vaporous form at atmospheric pressure and temperature. This may be a fluid which is liquid at the superatmospheric pressure at which the resin mixture is prepared or it may be soluble in the liquid resin mixture or it may be an at least partially soluble inert gas.

At least half of the expansion of the foam, and preferably substantially all of the expansion, takes place immediately upon release of pressure from the mixture. The agent which provides this sudden expansion may be designated "primary" blowing agent. It may sometimes be desirable to include in the formulation a material which causes additional expansion, e.g., due to heating of the extruded foam. This may be designated a "secondary" blowing agent.

Primary blowing agents are gases or fluids which have boiling points below about −20° C. Fluids which boil above about −20° C. and up to temperatures that are intended to be used in any particular application may be used as secondary blowing agents. Relatively low boiling points, e.g., between −20° and +20° C., are preferred in the secondary blowing agents. When secondary blowing agents are included in the formulation they are present in a minor molar proportion relative to the primary blowing agent.

Gases such as nitrogen and propane and soluble fluids such as various polychlorofluoromethanes have been successfully used as primary blowing agents. Other suitable gases for use in this invention are air, helium, methane and ethane. Carbon dioxide may be used where it does not have an undesirable interaction with the resin and/or curing agent present. It is not suitable when amino curing agents are used. In general, the fluid used should be inert with respect to the components of the mixture.

Suitable fluids of low boiling point include alkanes such as butanes as primary and pentanes as secondary blowing agents, though they are less preferred. Halogenated or otherwise substituted alkanes may be used. Particularly preferred are dichlorodifluoromethane and trichloromonofluoromethane. A series of chlorofluoroalkanes and -alkenes is available from Kinetic Chemicals, Inc., Wilmington, Delaware, under the trade name "Freon" and from General Chemical Division, Allied Chemical and Dye Corporation, New York City, New York, under the trade name "Genetron." Table 1 lists a number of Freons and Genetrons which can be used in the present invention.

TABLE 1

| "Freon" | "Genetron" | Formula | Boiling Point (° C) |
|---|---|---|---|
| "Freon-11" | "Genetron-11" | $CCl_3F$ | 23.7 |
| "Freon-12" | "Genetron-12" | $CCl_2F_2$ | −29.8 |
| "Freon-13" | | $CClF_3$ | −81.4 |
| "Freon-21" | | $CHCl_2F$ | 8.9 |
| "Freon-22" | "Genetron-141" | $CHClF_2$ | −40.8 |
| "Freon-114" | "Genetron-316" | $CClF_2-CClF_2$ | 3.6 |
| "Freon-115" | | $CClF_2-CF_3$ | −37.8 |
| | "Genetron-100" | $CH_3CHF_2$ | −24.7 |
| | "Genetron-101" | $CH_3CClF_2$ | −9.2 |
| | "Genetron-150" | $CH_2CF_2$ | −83.0 |
| | "Genetron-265" | $CClF=CF_2$ | −27.9 |

It is sometimes useful to include a surface-active agent in the liquid resin composition. This generally serves to decrease the surface tension of the composition and thereby promote increased expansion, smaller cells and more uniform cell size and texture of the expanded product. Surface-active agents of the non-ionic type are preferred for this use. Very suitable for this purpose are materials which are commercially available from Atlas Powder Company, Wilmington, Delaware, under the trade name "Span" and "Tween." These are, respectively, partial esters of the common fatty acids (lauric, palmitic, stearic and oleic) and "Hexitol" anhydrides (hexitans and hexides) derived from sorbitol ("Spans"), and materials derived from the "Span" products by adding polyoxyethylene chains to the non-esterified hydroxyls ("Tweens"). Excellent results have been obtained with polyoxyethylene sorbitanmonolaurate ("Tween-20") and polyoxyethylene sorbitanmonostearate ("Tween-60").

Another useful group of surfactants are polyoxyglycols having the following structure:

$$HO-(C_2H_4O)_a-(C_3H_6O)_b-(C_2H_4O)_c-H$$

wherein $b$ is equal to at least 15, and wherein the ethylene oxide portion of the molecule comprises from 16 to 80% of the molecular weight of the material. These compounds are available under the trade name "Pluronics" from Wyandotte Chemical Corporation of Wyandotte, Michigan.

In place of the above-mentioned conventional surface active agents it is particularly preferred to include in formulations according to this invention at least about 2% of a polyglycidyl ester of a fatty acid such as that described under polyepoxide "G" below. This serves the same purpose of improving fineness and evenness of cell structure and still enters as a component into the final resin structure, contributing additional desirable characteristics.

The composition of the invention may also include such conventional ingredients as plasticizers, pigments, dyes, fillers, lubricants, etc.

When the polyepoxide employed is a glycidyl polyether, the composition suitably contains a fluidizing solvent for said polyether. For this purpose there is used a liquid solvent which boils above about 50° C. at 760 mm. pressure, such as acetone, methylethylketone, isophorone, toluene, xylene, ethyl acetate, butyl acetate, chloroform, trichloropropane, and the like, or a mixture of such compounds. The liquid solvent is used in such amount that the composition has a viscosity of about 15 to 500 centipoises at 100° C. Thus, in compositions containing preferred polyethers having a viscosity of about 50 to 300 centipoises at 100° C. it is often desirable to have present about an added 3% to 10% of toluene or other normally liquid solvent for the polyether.

In the following examples, unless otherwise specified, parts disclosed are parts by weight.

Polyepoxides referred to by letters A through F are described under the same designation in U.S. 2,633,458; polyepoxides A, G and H are described below.

POLYETHER "A"

About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as Polyether A.

POLYEPOXIDE "G"

This polyepoxide contains a polyglycidyl ester of a mixture of dimer and trimer of long-chain aliphatic acids. Dimer and trimer acids and their mixtures are well known commercial products and may be prepared, for example, by the process of U.S. 2,482,761.

Polyepoxide "G" is the reaction product of 75 parts of the glycidyl ester of a mixture of about 75% of trimer fatty acid and about 25% dimer fatty acid having an epoxy value of 0.242 eq./100 g. and an OH value of 0.019, and 25 parts of polyether "A." It is a liquid of uniform composition.

POLYEPOXIDE "H"

This is a polymer whose monomer unit is 2,3-epoxy-cyclohexyl-methylepoxymethylcyclohexane carbonate.

The following formulations are illustrative of the present invention:

| Formulation 1 | | Formulation 2 | |
| --- | --- | --- | --- |
| Component | Parts | Component | Parts |
| Polyether "A" | 86 | Polyether "A" | 85 |
| Polyepoxide "G" | 54 | Polepoxide "G" | 15 |
| Bentone 38 | 6 | Bentone 38 | 6 |
| N-aminoethylpiperazine | 23 | Pigment | 3 |
| Nitrogen _____ p.s.i.g. | 150 | N-aminoethylpiperazine | 22 |
| | | Tween 60 | 0.05 |
| | | Propane | 5 |

| Formulation 3 | | Formulation 4 | |
| --- | --- | --- | --- |
| Component | Parts | Component | Parts |
| Polyether "A" | 100 | Polyether "A" | 33 |
| Refined coal tar | 33 | Polyepoxide "G" | 67 |
| Bentone 38 | 8 | Bentone 38 | 6 |
| "Freon-12" | 6 | Pigment | 3 |
| Nitrogen _____ p.s.i.g. | 50 | "Freon-22" | 10 |
| Diethylene triamine | 13 | Zinc stearate | 0.5 |
| | | Diethylene triamine | 10 |

Illustrative methods according to which foamed resins of this invention can be prepared are as follows:

Method I

This is essentially a batch method of foam preparation in which a fixed amount of foamable mixture is prepared in a pressure vessel and released as a single batch of foam. The method will be further described by reference to Formulation 4, shown above. The method is particularly suitable for the preparation of small batches of foamed polyepoxide composite.

A typical apparatus employed in practicing this method consists of a pressure vessel, such as a 9 inch long nipple of 2 inch pipe which is capped at one end and has a quarter turn plug valve attachable by means of a reducer at the other end. This vessel may be referred to as a "bomb." In a preferred modification, the end opposite the plug valve is connected to a gas supply such as a nitrogen cylinder. The bomb contains a number of steel balls which facilitate mixing of the contents of the bomb.

To prepare the mixture, the following additional equipment is required: a small, pressure-resistant vessel for curing agents, adapted to have one end attached tightly to the open end of the plug valve on said bomb and the other attached tightly to a gate valve; a gate valve; and a small pressure vessel adapted to containing a controlled amount of vaporizable liquid, e.g., "Freon-22."

Preparatory to preparing the foam, a mechanical blend of polyether "A," polyepoxide "G," Bentone 38, pigment and zinc stearate is prepared. About 370 grams of this base resin mix is poured into the bomb containing the steel balls. The valve assembly is then fixed in place. About 34 grams of diethylene triamine is placed into the above-mentioned vessel adapted for containing curing agent. The Freon vessel is filled with about 34 grams of "Freon-22." All the vessels and valves are then assembled together and placed in a vertical position, the bomb being the lowermost. The valves are opened thus permitting the Freon to expand through the gate valve and the vessel containing diethylene triamine and thus force the curing agent into the mixing bomb. The plug valve is then closed and the remaining vessels are disconnected. The pressure in the bomb at this point is 155 p.s.i.g., the vapor pressure of "Freon-22" at 25° C. The bomb is attached to a paint shaker and shaken for 5 minutes while the steel balls therein accomplish mixing and contacting of resin, curing agent and gas. The pressure within the bomb after the mixing process is 55 p.s.i.g., the pressure drop being indicative of solubility of "Freon-22" in the resin mixture. The bomb is then ready for dispensing a foam mixture. This is accomplished by taking the bomb to the place where the foam is to be used, inverting it so that the plug valve points downward and opening the valve to allow the foam to extrude as a frothy paste. Since the bomb would ordinarily remain filled with a small amount of foamy mixture it is preferable to have a gas supply attached to its upper end as stated above and apply sufficient gas pressure to force out all the remaining foam. This also prevents any change in pressure during the foam extrusion with resultant changes in foam properties.

It was found that a wide-opening valve, such as a plug valve, permitted production of substantially superior foams compared to those produced when the mixture was dispensed through other valves such as an ordinary needle valve or a gate or globe valve.

The foam mixture can be still further improved by dispensing it through a small orifice, e.g., of 0.04 to 0.11 inch diameter, placed across the discharge end of the plug valve. When a plug or cap of this nature is employed the pressure drop is taken substantially completely across the orifice.

The resin foam is discharged as a creamy mass which is able to wet completely the surfaces of any container into which it is discharged and which cures in place to form foams of the type described. The nature of the foam, such as its density, toughness, flexibility and the like, is determined by the selection of the various components of the mixture prepared in the bomb.

Method II

A machine method for continuous dispensing of foams was devised in order to produce larger masses of the foam of this invention. The machine consisted of a separate stirred pressure tank for the resin mixture and an unstirred pressure tank for curing agent. Each tank was provided with means for supplying gas under pressure thereto for the purpose of forcing out the contents through a discharge opening at the bottom. The discharge openings led through valved lines to inter-connected gear pumps which could be adjusted to provide a desired ratio of the contents of each tank to a mixing cylinder. The mixing cylinder contained an agitator and was provided with a bottom opening adapted to receive an ⅛ inch standard pipe plug.

A formulation suitable for preparation by this machine method is, for example, that shown as Formulation 3 above; the operation of the machine will be described by reference to that formulation. A base resin mix was prepared by mechanically blending polyether "A," Bentone 38 and a portion of the refined coal tar required by the formulation. About 3 gallons of this base resin mix were placed in the stirred resin tank. The tank was then sealed and a pre-weighed amount of "Freon-12" was added thereto from a small bomb container similar to that used in connection with Method I. The "Freon-12" was mixed into the resin in the container by a mechanical stirrer; the final vapor pressure of the mixture was about 40 p.s.i.g. Then 50–60 p.s.i.g. of continuous air or nitrogen pressure was impressed on the container in order to pressure feed the machine and eliminate variations in foam density due to pressure loss during the emptying of the sphere. The remaining amount of coal tar was pre-blended with diethylene triamine curing agent and the mixture placed in the second container. Similarly, about 50–60 p.s.i.g. of air or nitrogen pressure was impressed on this container to pressure feed the machine. The amount of coal tar blended with the diethylene triamine curing agent is a function of the volume ratio of resin to curing agent as set in the gear drive of the machine and does not affect the quality of the foam produced.

Contents from the two containers were fed through gear pumps powered by a common motor. These pumps both metered and pumped properly proportioned separate streams of resin and curing agent to a mixing chamber containing an air powered helical mixer. Foam was dispensed from that chamber in a continuous stream.

As stated above, the opening of the mixer was of a size adapted to receive an ⅛ inch standard pipe plug. When the mixture was discharged through this relatively large opening it was found that the foam produced was of a relatively uneven cell size distribution. A greatly improved foam was produced by placing into the opening a pipe plug which was sealed except for a single orifice of approximately 0.05 inch diameter. The machine may suitably be further modified by attaching directly to the large opening of the mixing chamber a flexible pressure line fitted at its end with a similar type of plug orifice. Regardless of the specific modification of apparatus employed, it is important for the purpose of obtaining good homogeneous foam structure that substantially all the pressure drop between the pressure chamber and the outside be across the final discharge opening.

It will be evident that both "bomb method I" and "machine method II" are based on the condition that the normally gaseous material employed is truly dissolved in the liquid resin mix before the material is released through the final orifice opening. This is found to be the case with all the formulations described above. If desired, however, the method of producing the foam mixtures of the present invention can be modified by adding a gas into the mixing chamber in such a manner that it will be entrained under pressure and will further increase the cell volume upon release to the orifice. This will permit the use of gases which are only partially soluble but is preferably limited to a continuous foam dispensing system.

The operations described above are characterized by the fact that the gas-liquid resin mixture is expanded through a device which permits rapid, complete initial expansion of the foam and that there are no dispensing lines or other obstructions after the point of expansion of the foam. If the expanded mixture were to pass through relatively narrow openings, the uniformity of the foam structure would be impaired by tearing of the foam.

The following examples will serve to further illustrate the invention:

EXAMPLE 1

A resin foam was prepared from Formulation 1 according to Method I. The density of the wet foam, immediately after formation, was 20 lb./cu. ft. Separate samples of this foam were permitted to cure for a period of two hours at an initial temperature of 25° C. The densities of several separately prepared samples of cured foam were in the range from 10 to 20 lb./cu. ft. They were hard, tough, non-friable foams.

EXAMPLE 2

A resin foam was prepared from Formulation 2 according to Method I. The density of the wet foam, immediately after formation, was 8 lb./cu. ft. This foam was permitted to cure for a period of three hours at an initial temperature of 25° C. The cured foam was hard, tough, non-friable and had a density of 4 lb./cu. ft.

EXAMPLE 3

A number of samples of resin foams were prepared from Formulation 3 according to both Method I and Method II. The density of the wet foam produced by Method I (bomb) was 7 lb./cu. ft. and those produced by Method II (machine) had densities from 7 to 20 lb./cu. ft. The foams were cured by standing at an initial temperature of 25° C. for a period of four hours. The density of the cured foam prepared according to Method I was 4 lb./cu. ft. and the cured samples prepared according to Method II had densities from 4 to 10 lb./cu. ft. They were moderately hard and tough. One of the chief advantages of this formulation is the low cost of the raw materials.

EXAMPLE 4

A resin foam was prepared from Formulation 4 according to Method I. The density of the wet foam, immediately after formation, was 6 lb./cu. ft. This foam was permitted to cure for a period of four hours at an initial temperature of 25° C. The cured foam had a density of 3.5 lb./cu. ft. The foam was moderately tough, fairly flexible and non-friable.

In the above-described methods of operation as applied in Examples 1–4, the formulations and conditions were selected in such a manner that the foam was discharged at substantially atmospheric temperature and there was in most cases no substantial rise above atmospheric temperature due to exothermicity of the curing reaction.

It is, in general, an important advantage of the present invention that foams can be prepared and cured at substantially atmospheric temperature, i.e., about 25° C. It may sometimes be desirable, however, to discharge foam under conditions of elevated temperature. The foam may be prepared, if desired, at elevated temperatures or the curing agent and conditions may be selected to provide a temperature rise, or the foam may be prepared and discharged at atmospheric temperature but placed into a container which is itself at an elevated temperature. Temperatures ranging from 25° C. to 200° C. may be employed under these conditions.

In the cases where elevated temperatures occur after the foam is discharged, the foam may expand further from one-third to twice in volume after discharge. This results in a lower density of the cured foam. In cases where the foam is discharged into an essentially closed space, i.e., one containing only small overflow openings, the subsequent expansion of the uncured foam results in complete penetration of small passages of the container.

The pressures employed in the mixing step of the process of this invention are suitably in the range from 15–250 p.s.i.g. When the sole expanding agent employed is a material which can be liquified at atmospheric temperatures the pressure is suitably the autogenic pressure of the liquid. Pressures in the range between 40 and 150 p.s.i.g. are usually preferred.

The curing times of foams are affected by the epoxy components and curing agents selected, the atmospheric temperature, mass and thickness of foam applied, and mass and temperature of the piece receiving the foam. The following are illustrative: a 17 lb./cu. ft. foam of a formulation similar to Formulation 1, cast as a ¼ inch thick layer on a heavy piece of ceramic material, will cure to a gel stage without expanding in 3–5 hours and to a hard stage in 24 hours. If 5–20 parts of an accelerator, such as phenol, per 100 parts resin is added to the formulation and the ceramic is at a temperature of 77° C., foam will cure hard without expanding in 50–60 minutes. The same formulation, with or without accelerator, if expanded and placed in a 16 oz. can, will increase in volume by 100 to 200% and cure hard within 1–2 hours. The density of the cured foam will be 6–10 lb./cu. ft. The same formulation with the addition of "Freon–12" gives a 6–7 lb./cu. ft. wet foam. When placed in a 16 oz. can, this foam expands only 50 to 100%, giving a 4–5 lb./cu. ft. cured foam. The lower expansion is due to the fact that the mass contains relatively less resin and hence results in a lower heat release.

In general, the foams prepared according to the process of this invention have the following characteristics: the foams are usually of the closed cell type, except where a gaseous expanding agent has been used in excess. In that case the cells may be interconnected to the extent of 40–60%, the remainder being closed. Cell size may vary from 0.05 mm. to 10 mm. for normal foams and may range as high as 30 mm. in foams which are highly expanded. The preferred techniques result in foams of highly uniform, closed cell structure of about 0.1–0.3 mm. size. Thermal conductivities of 0.3 to 0.4 B.t.u./hr./° F./sq. ft./in. have been observed in foams prepared from a formulation such as Formulation 1 and expanded to a density of 4 lb./cu. ft. Still lower thermal conductivities may be achieved in low density foams. The compressive strength of foams according to this invention is a function of the foam density. For example, foams of a density of about 3 lb./cu. ft. have a typical compressive strength of about 50 p.s.i. Foams of 10 lb./cu. ft. density have a compressive strength of about 250 p.s.i. and foams of 15 lb./cu. ft. density have a compressive strength of about 550 p.s.i.

The density of the foam resulting from a given formulation is substantially affected by the gas employed. For example, it was found that when using Method I with a formulation such as Formulation 3, nitrogen or air could be used in the bomb either concurrently with "Freon" or separately. Nitrogen or air pressure alone, at 100 p.s.i.g., yielded a foam having a density of 27 lb./cu. ft. At 150 p.s.i.g. the foam density was 22 lb./cu. ft. Solubility of nitrogen in the resin mixture was established by a test showing that when 50 p.s.i.g. of nitrogen pressure was placed on the bomb the pressure remaining after mixing was 40 p.s.i.g. Using nitrogen or air concurrently with "Freon–12" resulted in a cumulative effect which further reduced the density of the foam. Thus, at 100 p.s.i.g. nitrogen with 5 parts "Freon–12" per 100 parts resin, the density of the resulting foam was 13–15 lb./cu. ft. rather than the 22 lb./cu. ft. foam produced from "Freon–12" alone.

Foams produced according to this invention may be either substantially rigid foams or may be flexible, tough foams, depending mainly on the proportion of various polyepoxide components employed. Formulations in which the predominating polyepoxide is a polyether such as polyether "A" result in the production of essentially rigid foams. Polyepoxide "G" is added to such formulations, such as Formulations 1 and 2, to provide a certain degree of resilience, to produce a foam which is not friable and to reduce the exothermicity of the curing reaction. In Formulation 3 similar purposes are served by the refined coal tar.

A flexible foam is produced according to Formulation 4, in which the predominant amount of epoxide present is polyepoxide "G." The foam produced according to that formulation was found to be compressible to one-half to one-third its original volume. Formulations containing a major proportion of glycidyl ester composite and a minor proportion of polyglycidyl ethers generally produce foams of substantial flexibility and compressibility. Esters of this type are described in greater detail in copending patent application Serial Number 826,906 of H. A. Newey, filed on even date herewith. Resilient foams of this type are similar in many aspects to foam rubbers.

Foams having other desirable characteristics can be produced in some cases by including components which impart such characteristics. For example, highly flame-resistant foams are produced by formulations which, in addition to polyether "A" and polyether "D," contain a substantial amount of antimony trioxide and of a highly chlorinated organic compound which is capable of entering into the resin structure.

It will be evident from the above description that foams having a variety of characteristics can be made according to the process of this invention. The foams are generally characterized by the fact that they are substantially fully expanded before the curing reaction has proceeded to a substantial degree and that they are not dependent for expansion upon the addition of external heat or the creation of heat within the foam by an exothermic reaction.

Numerous modifications of the formulations, method of preparation and methods of utilization of the wet foams produced according to this invention will occur to the persons skilled in the art and the invention is limited only by the following claims.

We claim as our invention:

1. The process of producing a resin foam which comprises admixing in a mixing zone at substantially atmospheric temperature under a substantial superatmospheric pressure a fluid which is gaseous at atmospheric pressure at the temperature of said mixing zone with a liquid mass containing at least (a) as its essential resin component a poly-vic-epoxide having an epoxy equivalent greater than 1.0; (b) an epoxy curing agent; and (c) a thixotropic agent; releasing the mixture from said mixing zone into a space maintained at substantially atmoshperic pressure, whereby the mixture issues from said mixing zone in the form of a frothy, stable wet foam, and curing said wet foam.

2. A process according to claim 1 wherein said poly-vic-epoxide is a glycidyl ether of a phenol.

3. A process acocrding to claim 1 wherein said poly-vic-epoxide is a glycidyl ether of an alcohol.

4. A process according to claim 1 in which said poly-vic-epoxide comprises an expoxidized ester of an ethylenically unsaturated monohydric alcohol and an ethylenically unsaturated monocarboxylic acid in an amount in the range from about 2 to about 60% of the total epoxide.

5. A process according to claim 1 in which said curing agent is an amine.

6. A process according to claim 1 in which said thixotropic agent is a finely-divided solid.

7. A process according to claim 1 in which said thixotropic agent is a quarternary ammonium salt of bentonite.

8. A process according to claim 1 in which said thixotropic agent is a colloidal silica gel.

9. A process according to claim 1 in which said gaseous fluid is substantially completely miscible with said liquid resin mass at said superatmospheric pressure.

10. A process according to claim 1 in which said gaseous fluid is a polyhalo alkane boiling below 0° F.

11. A process according to claim 10 in which said gaseous fluid is a chlorofluoro alkane.

12. A process according to claim 1 in which said foam is cured at substantially atmospheric temperature.

13. As a composition of matter, a stable, wet uncured epoxy resin foam comprising a liquid phase containing as its essential resin component a poly-vic-epoxide having an epoxy equivalent greater than 1.0, an epoxidized ester of an ethylenically unsaturated monohydric alcohol and an ethylenically unsaturated monocarboxylic acid, and an epoxy curing agent and containing imbedded therein a thixotropic agent and a vapor phase comprising a fluid which is gaseous at atmospheric temperature and pressure and which at atmospheric temperature is at least partially soluble in said liquid mass at superatmospheric pressure and substantially insoluble therein at atmospheric pressure.

14. The process of producing a resin foam bonded to surfaces confining it which comprises admixing in a mixing zone at substantially atmospheric temperature and under substantial superatmospheric pressure a fluid which is gaseous at atmospheric pressure at the temperature of said mixing zone with a liquid mass containing at least (a) as its essential resin component a poly-vic-epoxide having an epoxy equivalent greater than 1.0; (b) an epoxy curing agent; and (c) a thixotropic agent; releasing the mixture from said mixing zone into a space defined by confining surfaces, said space being maintained at substantially atmospheric pressure, whereby the mixture issues from said mixing zone in the form of a frothy, stable wet foam which adheres to said confining surfaces and curing said foam whereby it is firmly bonded to said surfaces throughout the extent of its contact with said surfaces.

References Cited in the file of this patent

UNITED STATES PATENTS

| | | |
|---|---|---|
| 2,238,956 | Strother | Apr. 22, 1941 |
| 2,450,436 | McIntire | Oct. 5, 1948 |
| 2,576,977 | Stober | Dec. 4, 1951 |
| 2,739,134 | Parry et al. | Mar. 20, 1956 |
| 2,759,901 | Greenlee | Aug. 21, 1956 |
| 2,927,931 | Phillips et al. | Mar. 8, 1960 |
| 2,940,986 | Newey | June 14, 1960 |
| 2,993,014 | Schardt | July 18, 1961 |
| 2,993,869 | Gmitter et al. | July 25, 1961 |
| 3,006,869 | Schwencke et al. | Oct. 31, 1961 |

FOREIGN PATENTS

| | | |
|---|---|---|
| 758,562 | Great Britain | Oct. 3, 1956 |
| 783,956 | Great Britain | Oct. 2, 1957 |
| 575,013 | Canada | Apr. 28, 1959 |